(12) United States Patent
Shows et al.

(10) Patent No.: US 10,191,523 B2
(45) Date of Patent: Jan. 29, 2019

(54) SYSTEMS AND METHODS FOR MANAGEMENT OF EXHAUST TEMPERATURE IN AN INFORMATION HANDLING SYSTEM

(71) Applicant: Dell Products L.P., Round Rock, TX (US)

(72) Inventors: Thomas Alexander Shows, Cedar Park, TX (US); Travis C. North, Cedar Park, TX (US); Deeder M. Aurongzeb, Round Rock, TX (US); Austin Michael Shelnutt, Leander, TX (US); Christopher M. Helberg, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 91 days.

(21) Appl. No.: 14/816,893

(22) Filed: Aug. 3, 2015

(65) Prior Publication Data
US 2017/0038804 A1   Feb. 9, 2017

(51) Int. Cl.
*G06F 1/20* (2006.01)
*G06F 1/32* (2006.01)

(52) U.S. Cl.
CPC .............. *G06F 1/206* (2013.01); *G06F 1/324* (2013.01); *Y02D 10/126* (2018.01); *Y02D 10/16* (2018.01)

(58) Field of Classification Search
CPC ....... G06F 1/206; G06F 1/324; Y02D 10/126; Y02D 10/16
See application file for complete search history.

(56) References Cited

U.S. PATENT DOCUMENTS

| 7,899,333 | B2* | 3/2011 | Ma | H01L 23/34 398/135 |
| 8,532,826 | B2* | 9/2013 | Moss | G06F 1/206 340/500 |
| 9,020,656 | B2* | 4/2015 | Shelnutt | G06F 1/206 700/299 |
| 9,326,431 | B2* | 4/2016 | Matsushita | H05K 7/20745 |
| 9,516,787 | B2* | 12/2016 | Iwama | H05K 7/20209 |
| 9,625,963 | B2* | 4/2017 | Mittal | G06F 1/206 |
| 2006/0047808 | A1* | 3/2006 | Sharma | G06F 9/505 709/224 |
| 2009/0323275 | A1* | 12/2009 | Rehmann | G06F 1/1632 361/679.48 |
| 2011/0140898 | A1* | 6/2011 | Berke | G08B 5/36 340/584 |
| 2011/0224837 | A1* | 9/2011 | Moss | G06F 1/206 700/295 |

(Continued)

*Primary Examiner* — Abdelmoniem I Elamin
(74) *Attorney, Agent, or Firm* — Jackson Walker L.L.P.

(57) ABSTRACT

In accordance with embodiments of the present disclosure, a method may include based on a power consumed by at least one information handling resource and thermal resistances associated with heat-rejecting media thermally coupled to the at least one information handling resource, calculating an exhaust temperature of the heat-rejecting media proximate to an exhaust of an enclosure housing the at least one information handling resource. The method may also include based on the exhaust temperature, controlling at least one of an operating frequency of the at least one information handling resource and a flow rate of fluid proximate to the heat-rejecting media.

16 Claims, 3 Drawing Sheets

(56) References Cited

U.S. PATENT DOCUMENTS

| | | | | |
|---|---|---|---|---|
| 2012/0036375 A1* | 2/2012 | Puschini Pascual | ........................ | |
| | | | G06F 9/5027 | |
| | | | 713/300 | |
| 2012/0284547 A1* | 11/2012 | Culbert | ..................... G06F 1/20 | |
| | | | 713/322 | |
| 2013/0258582 A1* | 10/2013 | Shelnutt | .................. G06F 1/206 | |
| | | | 361/679.48 | |
| 2013/0332757 A1* | 12/2013 | Moss | ...................... G06F 1/206 | |
| | | | 713/320 | |
| 2014/0160657 A1* | 6/2014 | Morrison | .............. G06F 1/1626 | |
| | | | 361/679.21 | |
| 2014/0361092 A1* | 12/2014 | Iizuka | ..................... G06F 1/206 | |
| | | | 236/49.3 | |
| 2016/0037686 A1* | 2/2016 | Shabbir | .............. H05K 7/20727 | |
| | | | 700/300 | |
| 2016/0062422 A1* | 3/2016 | Mittal | ................... G06F 1/3234 | |
| | | | 713/320 | |
| 2017/0031397 A1* | 2/2017 | Shows | .................... G06F 1/206 | |

\* cited by examiner

SYSTEMS AND METHODS FOR MANAGEMENT OF EXHAUST TEMPERATURE IN AN INFORMATION HANDLING SYSTEM

TECHNICAL FIELD

The present disclosure relates in general to information handling systems, and more particularly to thermal control of an exhaust temperature of an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As processors, graphics cards, random access memory (RAM) and other components in information handling systems have increased in clock speed and power consumption, the amount of heat produced by such components as a side-effect of normal operation has also increased. Various heat-rejecting media may be used to cool heat-generating components, including fluids (e.g., air via a fan, liquid via a pump-connected liquid conduit) conveyed proximate to the components, thermally-conductive solids (e.g., heatsinks, heat pipes, heat spreader plates, etc.) coupled to such components, or a combination thereof. In some instances, it is often beneficial that a heat-rejecting medium is shared among multiple components. For example, in an information handling system, a heat-rejecting medium may be used to cool both a processor and a co-processor (e.g., graphics processor).

Such heat-rejecting media are often thermally coupled to an exhaust which exhausts heated air to an outside of an enclosure for housing components of an information handling system in order reduce operating temperatures of components. Increasingly, designs of information handling systems and their associated enclosures enable a user to, either intentionally or unintentionally, touch the exhaust including heat-rejecting media (e.g., finstacks) thermally coupled to the exhaust. An information handling system exhaust may reach a temperature that may become unsafe or uncomfortable for a user to touch. Accordingly, systems and methods for managing the exhaust temperature of an information handling system are desirable. Existing approaches require a closed loop control using dedicated exhaust temperature sensors to directly measure or infer surface temperature in order to thermally manage an information handling system. However, use of such dedicated sensors is often undesirable, as it often requires attaching a temperature sensor to an exhaust using an adhesive, and such temperature sensor may be highly susceptible to damage.

SUMMARY

In accordance with the teachings of the present disclosure, the disadvantages and problems associated with thermal control of an information handling system exhaust may be substantially reduced or eliminated.

In accordance with embodiments of the present disclosure, an information handling system may include at least one information handling resource; heat-rejecting media thermally coupled to the at least one information handling resource for transferring heat generated to an exterior of an enclosure housing the at least one information handling resource; a temperature sensor for sensing an ambient temperature associated with the information handling resource; and a thermal management driver comprising a program of instructions embodied in computer-readable media and executable by a processor. The thermal management driver may be configured to based on a power consumed by the at least one information handling resource and thermal resistances associated with the heat-rejecting media, calculate an exhaust temperature of the heat-rejecting media proximate to an exhaust of the enclosure, and based on the exhaust temperature, control at least one of an operating frequency of the at least one information handling resource and a flow rate of fluid proximate to the heat-rejecting media.

In accordance with these and other embodiments of the present disclosure, a method may include based on a power consumed by at least one information handling resource and thermal resistances associated with heat-rejecting media thermally coupled to the at least one information handling resource, calculating an exhaust temperature of the heat-rejecting media proximate to an exhaust of an enclosure housing the at least one information handling resource. The method may also include based on the exhaust temperature, controlling at least one of an operating frequency of the at least one information handling resource and a flow rate of fluid proximate to the heat-rejecting media.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
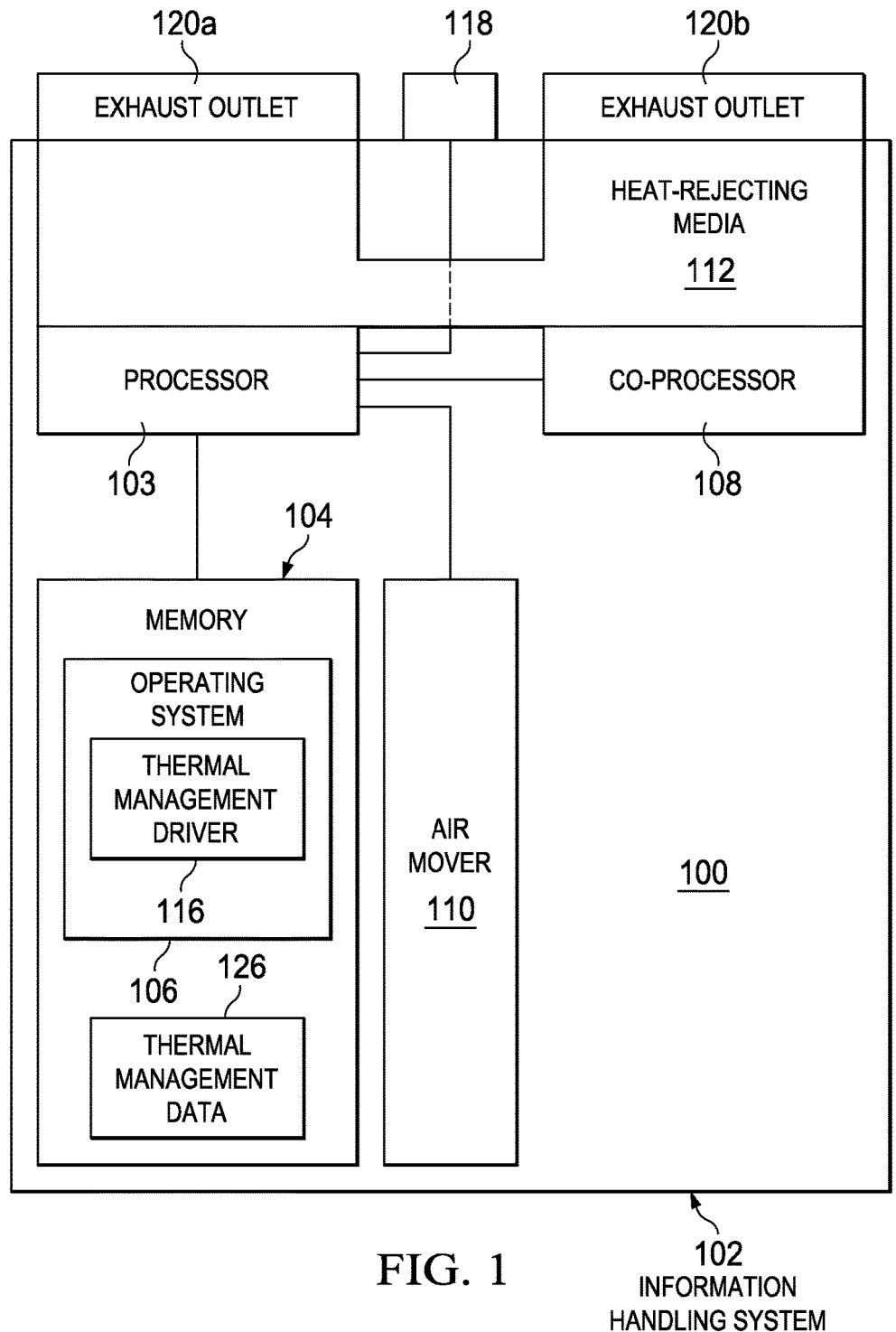
FIG. 1 illustrates a block diagram of an example information handling system, in accordance with certain embodiments of the present disclosure.
Figure 2:
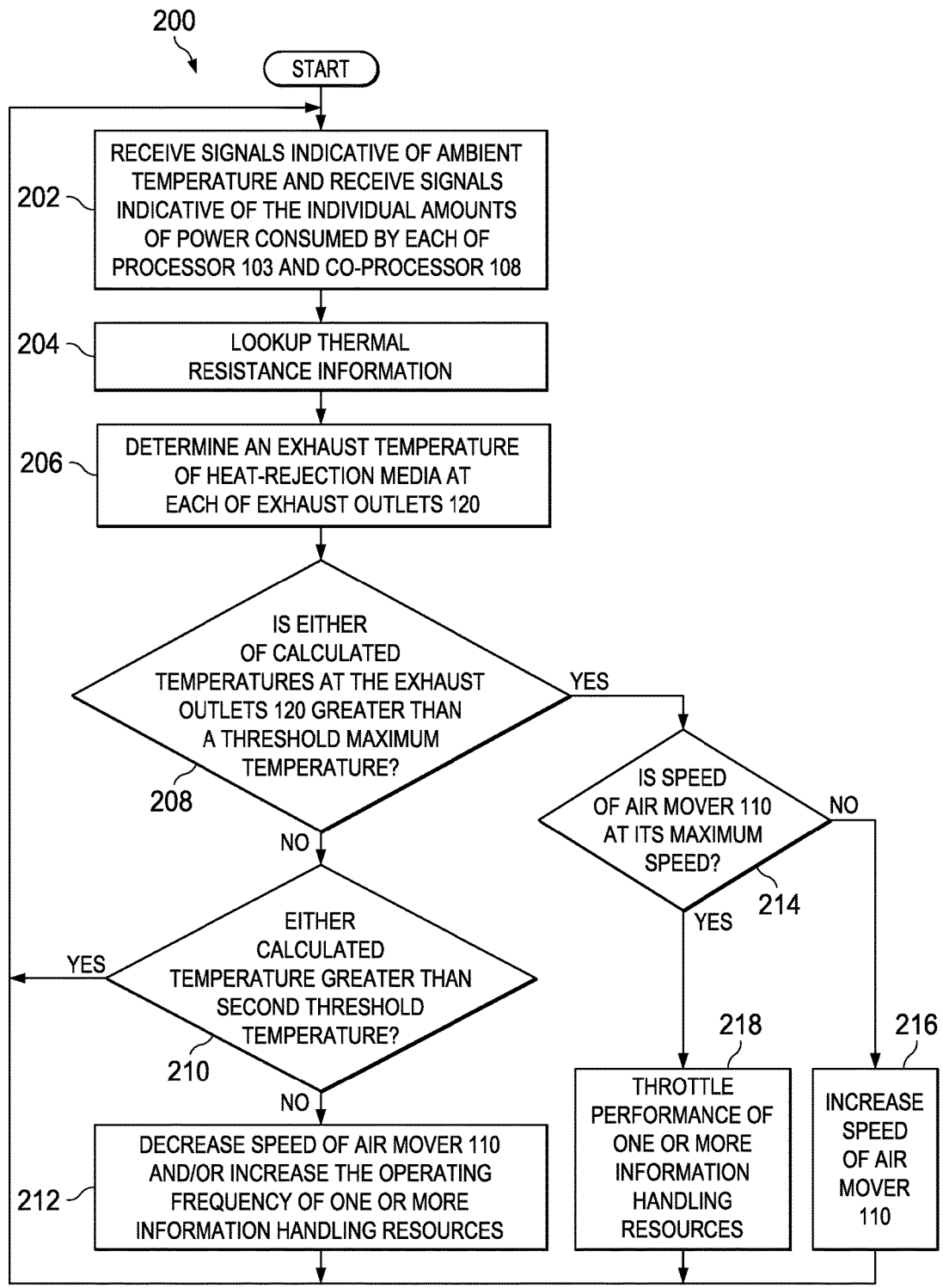
FIG. 2 illustrates a flow chart of an example method for managing exhaust temperature of an information handling system, in accordance with certain embodiments of the present disclosure.
Figure 3:
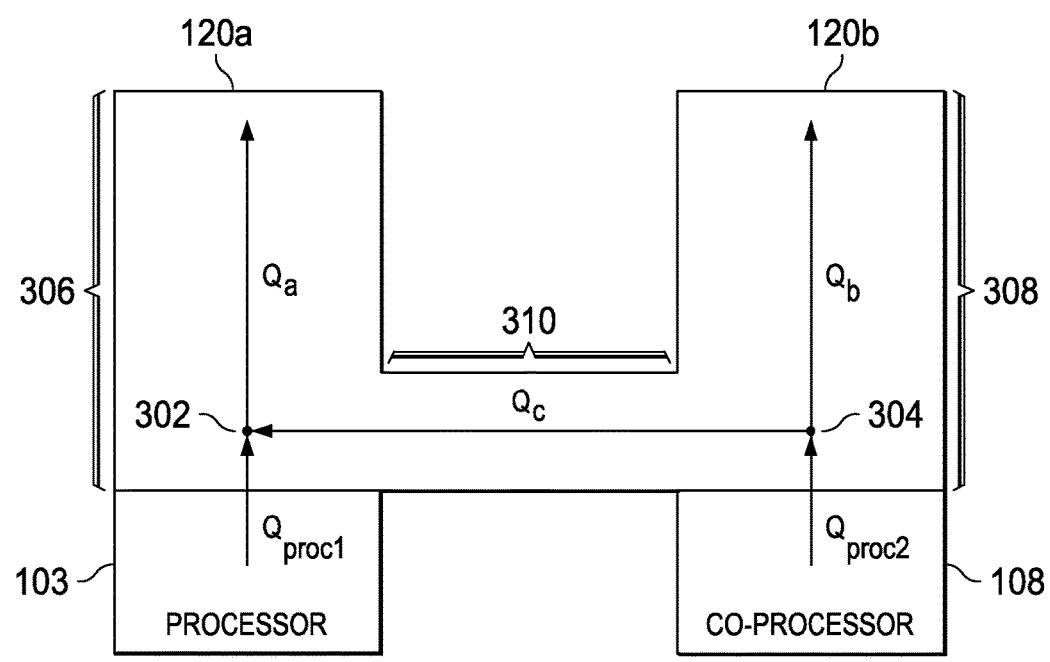
FIG. 3 illustrates an example energy-balance diagram, in accordance with certain embodiments of the present disclosure.

Preferred embodiments and their advantages are best understood by reference to FIGS. 1 through 3, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

FIG. 1 illustrates a block diagram of an example information handling system 102, in accordance with embodiments of the present disclosure. In some embodiments, information handling system 102 may comprise a server. In other embodiments, information handling system 102 may be a personal computer (e.g., a desktop computer, a laptop, notebook, tablet, handheld, smart phone, personal digital assistant, etc.). As depicted in FIG. 1, information handling system 102 may include an enclosure 100 housing a plurality of information handling resources including, without limitation, processor 103, a memory 104 communicatively coupled to processor 103, a co-processor 108 communicatively coupled to processor 103 and memory 104, one or more air movers 110, heat-rejecting media 112 thermally coupled to each processor 103 and co-processor 108, a temperature sensor 118 communicatively coupled to processor 103, and a plurality of exhaust outlets 120a and 120b (which may be referred to collectively as "exhaust outlets 120" or individually as an "exhaust outlet 120") thermally coupled between heat-rejecting media 112 and the exterior of enclosure 100.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have operating system 106 and thermal management data 126 stored thereon. Operating system 106 may be any program of executable instructions, or aggregation of programs of executable instructions, configured to manage and/or control the allocation and usage of hardware resources (e.g., processor 103, memory 104, and/or other information handling resources) and provide an interface between such hardware resources and application programs hosted by operating system 106, and thus may act as a host for application programs to be executed by information handling system 102. Active portions of operating system 106 may be read and executed by processor 103 in order to carry out the functionality of operating system 106. Examples of operating system 106 may include, without limitation, Windows, MacOS, UNIX, LINUX, Android, iOS, or any other closed or open source operating system.

As depicted in FIG. 1, operating system 106 may include a thermal management driver 116. Thermal management driver 116 may comprise a program of instructions configured to, when read and executed by processor 103, provide an interface between operating system 106 and processor 103 configured to, based on thermal information communicated from temperature sensor 118, control the operation of air movers 110 and/or operating frequencies of processor 103 and co-processor 108 to ensure that an exhaust temperature of information handling system 102 does not exceed thermal limits.

As described in greater detail below, thermal management data 126 may comprise information used or stored by thermal management driver 116 including a lookup table regarding thermal resistances present in information handling system 102, thermal limits of information handling resources, and/or other information that may be used by thermal management driver 116 in order to perform thermal management of information handling system 102.

Although operating system 106 and thermal management data 126 are depicted as being stored on memory 104, in some embodiments, operating system 106 and/or thermal management data 126 may be stored on a computer-readable medium other than memory 104, and read into memory 104 for execution by processor 103. In addition, although thermal management is shown and described as being undertaken by a driver executing on operating system 106, such thermal management may also be undertaken by an application program or another controller (e.g., a management controller such as a baseboard management controller, chassis management controller, enclosure controller, or similar controller).

Co-processor 108 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, co-processor 103 may interpret and/or execute program instructions and/or process data stored in memory 104 and/or another component of information handling system 102. In these and other embodiments, co-processor 108 may be a special-purpose processor for executing specialized or particular instructions, such as a graphics processing unit configured to rapidly manipulate and alter memory (e.g., memory 104) to accelerate the creation of images in a frame buffer intended for output to a display.

Air mover 110 may be communicatively coupled to processor 103, and may include any mechanical or electromechanical system, apparatus, or device operable to move air and/or other gasses. In some embodiments, air mover 110 may comprise a fan (e.g., a rotating arrangement of vanes or blades which act on the air). In other embodiments, air mover 110 may comprise a blower (e.g., a centrifugal fan that employs rotating impellers to accelerate air received at its intake and change the direction of the airflow). In these and other embodiments, rotating and other moving components of air mover 110 may be driven by a motor. The rotational speed of such motor may be controlled by suitable control signals communicated from processor 103 or a controller of air mover 110 in communication with processor 103. In operation, air mover 110 may cool information handling resources of information handling system 102 by drawing cool air into enclosure 100, expelling warm air from inside enclosure 100 to the outside of enclosure 100, and/or move air across heat-rejecting media 112 internal to enclosure 100 to cool one or more information handling resources (e.g., processor 103 and/or co-processor 108).

Heat-rejecting media 112 may include any system, device, or apparatus configured to transfer heat from an information resource, thus reducing a temperature of the information handling resource. For example, heat-rejecting media 112 may include a fluid conveyed proximate to an information handling resource (e.g., air conveyed by a fan or blower, liquid conveyed via a liquid conduit by a pump, etc.), or a solid thermally coupled to the information handling resource (e.g., heatpipe, heat spreader, heatsink, finstack, etc.). As shown in FIG. 1, heat-rejecting media may be thermally coupled to and thus shared by multiple information handling resources of information handling system 102 (e.g., processor 103 and co-processor 108), such that heat is transferred from multiple information handling resources to heat-rejecting media 112.

A temperature sensor 118 may comprise any system, device, or apparatus (e.g., a thermometer, thermistor, etc.) configured to communicate a signal to processor 103 indicative of a temperature within information handling system 102. For example temperature sensor 118$c$ may sense an ambient temperature of the exterior of enclosure 100. Exhaust outlets 120 may be thermally coupled between the exterior of enclosure 100 and heat-rejecting media 112, thus allow heat rejected by heat-rejecting media 112 to be rejected to the exterior of enclosure 100.

In addition to processor 103, memory 104, co-processor 108, air mover 110, temperature sensor 118, and exhaust outlets 120, information handling system 102 may include one or more other information handling resources.

FIG. 2 illustrates a flow chart of an example method for managing exhaust temperature of an information handling system, in accordance with certain embodiments of the present disclosure. According to some embodiments, method 200 may begin at step 202. As noted above, teachings of the present disclosure may be implemented in a variety of configurations of information handling system 102.

At step 202, thermal management driver 116 may receive signals indicative of the individual amounts of power consumed by each of processor 103 and co-processor 108 (e.g., from a power management bus or other information handling resource of information handling system 102) and a signal indicative of an ambient temperature (e.g., from temperature sensor 118).

At step 204, thermal management driver 116 may look up thermal resistance information (e.g., from thermal management data 126) for the thermal junction between processor 103 and heat-rejecting media 112 and for the thermal junction between co-processor 108 and heat-rejecting media 112, and thermal resistances associated with heat-rejecting media 112.

At step 206, thermal management driver 116 may, based on the amounts of power consumed by each of processor 103 and co-processor 108, and the thermal resistances of the junctions between heat-rejecting media 112 and each of processor 103 and co-processor 108, and the thermal resistances associated with heat-rejecting media 112, apply energy-balance nodal equations to determine exhaust temperature of heat-rejecting media 112 at each of exhaust outlets 120. Reference is made to FIG. 3, which depicts an example energy-balance diagram depicting energy flows into thermal nodes of heat-rejecting media 112. For node 302, heat $Q_a$ rejected by a portion 306 of heat-rejection media 112 may be given by $Q_a=Q_{proc1}+Q_c$, where $Q_c$ is heat flowing from node 304 to node 302 via portion 310 of heat-rejection media 112 and $Q_{proc1}$ is the power consumed by processor 103. For node 304, heat $Q_b$ rejected by a portion 306 of heat-rejection media 112 may be given by $Q_b=Q_{proc2}-Q_c$, where $Q_{proc2}$ is the power consumed by co-processor 108.

Furthermore, the rejected heat $Q_a$ may be given by $Q_a=(T_a-T_{ambient})/R_a$ and heat $Q_b$ may be given by $Q_b=(T_b-T_{ambient})/R_b$, where $T_a$ is the temperature at node 302 (which may be assumed to be the temperature of heat-rejecting media 112 at exhaust outlet 120$a$), $R_a$ is a thermal resistance between node 302 and ambient air (which may be a function of a speed of air mover 110), $T_b$ is the temperature at node 304 (which may be assumed to be the temperature of heat-rejecting media 112 at exhaust outlet 120$b$), $R_b$ is a thermal resistance between node 304 and ambient air (which may be a function of a speed of air mover 110), and $T_{ambient}$ is an ambient temperature. Furthermore, heat $Q_c$ may be given by $Q_c=(T_b-T_a)/R_c$, where $R_c$ is the thermal resistance of heat-rejecting media 112 between nodes 302 and 304. Thus, by substitution, the following equations represent flow of thermal power:

$$(T_a-T_{ambient})/R_a=Q_{proc1}+(T_b-T_a)/R_c$$

$$(T_b-T_{ambient})/R_b=Q_{proc2}+(T_b-T_a)/R_c$$

All of the values in the above equations are known except temperatures for $T_a$ and $T_b$, and thermal management driver may calculate temperatures $T_a$ and $T_b$ by solving for the above set of equations.

At step 208, thermal management driver 116 may compare the calculated temperatures $T_a$ and $T_b$ at the exhaust outlets 120 to a threshold maximum temperature. If either of the calculated temperatures at the exhaust outlets 120 are greater than the threshold maximum temperature, method 200 may proceed to step 214. Otherwise, method 200 may proceed to step 210.

At step 210, responsive to each calculated temperature at the exhaust outlets 120 being lesser than the threshold maximum temperature, thermal management driver 116 may compare the calculated temperatures at the exhaust outlets 120 to a second threshold temperature lower than the threshold maximum temperature. If either calculated temperature is greater than the second threshold temperature, method 200 may proceed again to step 202. Otherwise, method 200 may proceed to step 212.

At step 212, responsive to each calculated temperature at the exhaust outlets 120 being lesser than the second threshold temperature, thermal management driver 116 may decrease a speed of air mover 110 and/or increase the operating frequency of one or more information handling resources (e.g., processor 103 and/or co-processor 108). After completion of step 212, method 200 may proceed again to step 202.

At step 214, responsive to one of the calculated temperatures at the exhaust outlets 120 being greater than the threshold maximum temperature, thermal management driver 116 may determine if a speed of air mover 110 is at its maximum speed. If the speed of air mover 110 is at its maximum speed, method 200 may proceed to step 218. Otherwise, method 200 may proceed to step 216.

At step 216, thermal management driver 116 may increase the speed of air mover 110. After completion of step 216, method 200 may proceed again to step 202.

At step 218, thermal management driver 116 may throttle performance of one or more information handling resources (e.g., processor 103 and/or co-processor 108) of information handling system 102. After completion of step 218, method 200 may proceed again to step 202.

Although FIG. 2 discloses a particular number of steps to be taken with respect to method 200, method 200 may be executed with greater or lesser steps than those depicted in FIG. 2. In addition, although FIG. 2 discloses a certain order of steps to be taken with respect to method 200, the steps comprising method 200 may be completed in any suitable order.

Method 200 may be implemented using information handling system 102 or any other system operable to implement method 200. In certain embodiments, method 200 may be implemented partially or fully in software and/or firmware embodied in computer-readable media.

Although the systems and methods described above contemplate determination of exhaust temperature based on heat generated by processor 103 and co-processor 108, in some embodiments the systems and methods described above can be applied to information handling resources other than processor 103 and co-processor 108.

As used herein, when two or more elements are referred to as "coupled" to one another, such term indicates that such two or more elements are in electronic communication, thermal communication, or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. An information handling system comprising:
   at least one information handling resource, including a first and a second information handling resource;
   heat-rejecting media thermally coupled to the at least one information handling resource for transferring heat generated to an exterior of an enclosure housing the at least one information handling resource, wherein the heat-rejecting media is proximate to an exhaust of the enclosure such that the heat-rejecting media is subject to physical contact with a user of the information handling system via the exhaust while the information handling system is operational and while the enclosure is closed;
   a temperature sensor for sensing an ambient temperature associated with the at least one information handling resource; and
   a thermal management driver comprising a program of instructions embodied in non-transitory computer-readable media and executable by a processor, the thermal management driver configured to:
      based on a first power consumed by the first information handling resource, a second power consumed by the second information handling resource, and thermal resistances associated with the heat-rejecting media, calculate an exhaust temperature and a second exhaust temperature of the heat-rejecting media proximate to, respectively, the exhaust of the enclosure and a second exhaust of the enclosure; and
      based on a determination that at least one of the exhaust temperature and the second exhaust temperature is greater than a maximum temperature that is safe for human contact, control at least one of an operating frequency of the at least one information handling resource and a flow rate of fluid proximate to the heat-rejecting media to lower the at least one of the exhaust temperature and the second exhaust temperature to a new exhaust temperature that is below the maximum temperature that is safe for human contact.

2. The information handling system of claim 1, wherein the thermal resistances comprise at least a thermal resistance of a portion of the heat-rejecting media thermally coupled between the first information handling resource and the second information handling resource.

3. The information handling system of claim 1, wherein the fluid comprises air, and the thermal management driver is further configured to control the flow rate of the fluid by controlling a speed associated with an air mover for driving the air.

4. The information handling system of claim 3, wherein the thermal management driver is further configured to decrease an operating frequency of the at least one information handling resource responsive to determining that the exhaust temperature is greater than the maximum temperature that is safe for human contact and determining that the speed is at a maximum speed.

5. The information handling system of claim 1, wherein the thermal management driver is further configured to decrease an operating frequency of the at least one information handling resource responsive to determining that the exhaust temperature is greater than the maximum temperature that is safe for human contact.

6. The information handling system of claim 1, wherein the thermal management driver is further configured to increase the flow rate of fluid responsive to determining that the exhaust temperature is greater than the maximum temperature that is safe for human contact.

7. The information handling system of claim 1, wherein the at least one information handling resource includes at least one of the processor, a processor other than the processor, and a graphics processing unit.

8. The information handling system of claim 1, wherein the thermal resistances comprise at least one of:
   a thermal resistance between the at least one information handling resource and the heat-rejecting media; and
   a thermal resistance between the heat-rejecting media and ambient air.

9. A method comprising:
   based on a first power consumed by a first information handling resource, a second power consumed by a second information handling resource, and thermal resistances associated with heat-rejecting media thermally coupled to the first and second information handling resources, a thermal management driver of an information handling system calculating an exhaust temperature and a second exhaust temperature of the heat-rejecting media proximate to, respectively, an exhaust and a second exhaust of an enclosure housing the first and second information handling resources, wherein the heat-rejecting media is subject to physical contact with a user of the information handling system via the exhaust while the information handling system is operating and while the enclosure is closed; and
   based on at least one of the exhaust temperature and the second exhaust temperature, the thermal management driver altering at least one of an operating frequency of at least one of the first and second information handling resources and a flow rate of fluid proximate to the heat-rejecting media, wherein the thermal management driver is configured to:
      in response to a determination that the at least one of the exhaust temperature and the second exhaust temperature is greater than a maximum temperature that is safe for human contact, control at least one of the operating frequency and the flow rate to lower the at least one of the exhaust temperature and the second exhaust temperature to a new exhaust temperature that is below the maximum temperature that is safe for human contact.

10. The method of claim 9, wherein the thermal resistances comprise at least a thermal resistance of a portion of the heat-rejecting media thermally coupled between the first information handling resource and the second information handling resource.

11. The method of claim 9, wherein the fluid comprises air, and controlling the flow rate of fluid comprises controlling a speed associated with an air mover for driving the air.

12. The method of claim 11, further comprising decreasing an operating frequency of at least one of the first and second information handling resources responsive to determining that the exhaust temperature is greater than the maximum temperature that is safe for human contact and determining that the speed is at a maximum speed.

13. The method of claim 9, further comprising decreasing an operating frequency of at least one of the first and second information handling resources responsive to determining that the exhaust temperature is greater than the maximum temperature that is safe for human contact.

14. The method of claim 9, further comprising increasing the flow rate of fluid responsive to determining that the exhaust temperature is greater than the maximum temperature that is safe for human contact.

15. The method of claim 9, wherein the first information handling resource includes at least one of a processor and a graphics processing unit.

16. The method of claim 9, wherein the thermal resistances comprise at least one of:
   a thermal resistance between the first information handling resource and the heat-rejecting media; and
   a thermal resistance between the heat-rejecting media and ambient air.

* * * * *